May 9, 1933.  E. G. GAGE  1,907,781
DOUBLE ELECTRODE
Filed May 7, 1927
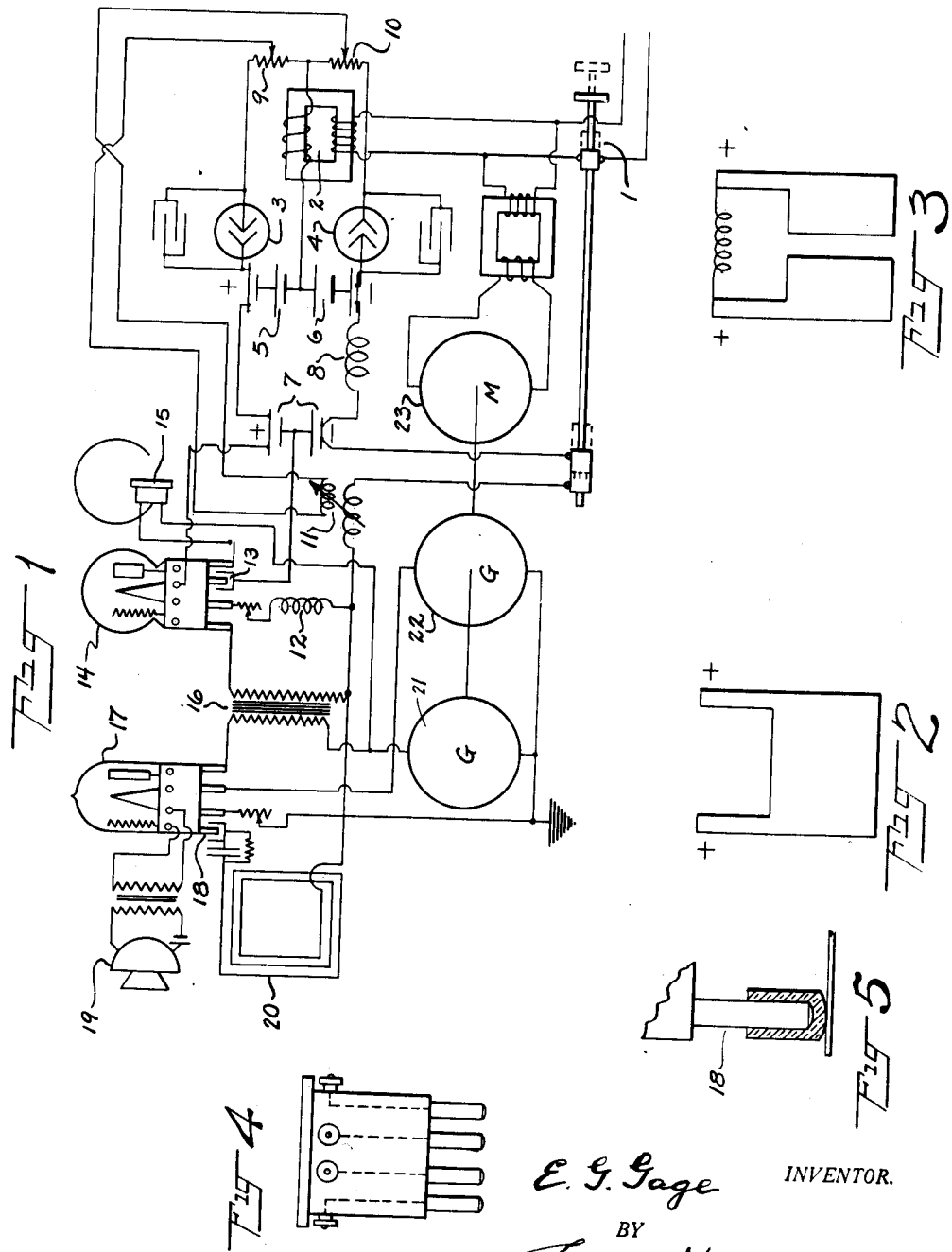
E. G. Gage INVENTOR.
BY
Thomas Howe ATTORNEY.

Patented May 9, 1933

1,907,781

UNITED STATES PATENT OFFICE

EDWARD G. GAGE, OF BROOKLYN, NEW YORK, ASSIGNOR TO RADIO CORPORATION OF AMERICA, A CORPORATION OF DELAWARE

DOUBLE ELECTRODE

Application filed May 7, 1927. Serial No. 189,591.

My present invention relates to a system for supplying both the filament and plate circuits of vacuum tubes from an alternating current supply, such as is commonly found in residences, offices, etc., and distributing the units in such manner that the entire system may be assembled within a case as for example, within a phonograph cabinet.

An object of my invention is to provide refinements in the filament heating current supply to enable the most sensitive instruments such as radio apparatus with multistage amplifiers to receive from great distances without interference from the lighting circuit.

In the practical application of my invention current for the filament is obtained from an alternating current source, and is used to charge a battery of miniature storage cells through two rectifiers, each rectifier being so connected that it charges only half of the battery and operates during a period when the other rectifier is idle. This prevents adding of interfering pulses.

The total counter electromotive force of this battery is then used to charge another miniature storage battery having a smaller number of cells than the first, consequently a lower counter electromotive force.

This second set of cells is shielded from the alternating current supply by an impedance, and the load is connected across the terminals of these cells, whose counter electromotive force supplies the necessary current without fluctuation.

The plate circuit is supplied from a motor generator operated preferably from the same alternating current supply.

To enable different types of vacuum tubes to be used which may differ as to their electrical constants, I have shown an improved type of socket adapter, which allows any element of the tube to be used at will, so that it may be operated from a separate and independent source if desired. As an example, a special tube may be placed in a set using tubes of another type already supplied with generator current, and the special tube may be supplied with current from a dry battery or from a tap from a filter circuit.

My invention will best be understood by reference to the following description taken in connection with the accompanying drawing in which:

Fig. 1 shows my complete system for supplying current to vacuum tubes from an alternating current supply, Figs. 2 and 3 show in detail a special type of storage battery plate used in the miniature cells of the system, and Figs. 4 and 5 show in detail a special type of socket adapter, which enables a tube to be operated from a source independent of the alternating current supply if desired.

In Fig. 1, numeral 1 designates the source of alternating current supply which may be of the commercial 60 cycle 110 volt type. Numeral 2 is a transformer having both primary and secondary well insulated from each other, the secondary of which supplies current to the two rectifiers 3 and 4. These rectifiers may be one of a number of types or of different types, such as electrolytic, gaseous, rotary converter or any type giving constant operation.

For the electrolytic I have found the so-called "Colloid" rectifier having aluminum and lead elements satisfactory, also the tantalum and lead acid combination, and for the gaseous the so-called Tungar bulb.

If an electrolytic rectifier is used no condenser is necessary shunting it, as a condenser is inherent in the rectifier itself. I have found it advantageous in the case of an electrolytic rectifier to disconnect it from the batteries when not in use to prevent back leakage.

In case a Tungar rectifier is used its filament is heated in the customary manner and a condenser of approximately 2 mfds. connected in shunt to the hot and cold elements. This prevents shock excitation of the system by the action of the rectifier which would otherwise be detected by a radio receiver.

The battery of miniature storage cells 5 and 6 is charged in relays through the rectifiers 3 and 4 in the following manner.

Assuming a positive pulse from the transformer secondary to arrive at the intersection or middle tap of the battery as shown. It can flow only through the circuit including rectifier 3 and battery division 5, hence charges that division.

On the other hand when the current changes to negative it cannot flow through this last named circuit but can flow through rectifier 4 and battery division 6, charging that division.

Neither pulse can flow beyond impedance 8, and as both halves of the current do not flow at the same time through battery divisions 5 and 6, the voltage due to the drop across the battery terminals is less by half, hence the disturbance due to interfering pulses is diminished by half.

The counter E. M. F. of battery divisions 5 and 6 respectively, when using lead acid elements is approximately 2.25 volts, and there being two battery elements for each division the total counter E. M. F. across the terminals of the first battery is 9 volts.

The second set of miniature storage batteries, containing a smaller number of cells than the first, and shown as two cells numeral 7 is charged by the 9 volts counter E. M. F. from the first set of cells and in turn delivers a C. E. M. F. of 4.5 volts to the load.

This second set of cells by reason of the choking effect of the impedance 8 is not affected by the main charging source, which is pulsating, hence delivers a substantially smooth current to the load.

In practice I have found an impedance having a direct current resistance of 1 ohm and a resistance of 500 ohms at 60 cycles to be satisfactory in shielding the second set of cells from the rectified alternating current charging source where the output is 6 volts or less.

A second impedance 12 may be included in the leads of the load circuit as a further refinement and protection against local inductive effects if necessary.

The resistances 9 and 10 are pure resistances of the order of .2 ohms each and are continuously variable. The impedance 11 is also made continuously variable between 0 and .1 ohms. The purpose of these resistances is to introduce by way of a resistance coupled circuit, equal pulses from the rectifier circuit in opposition to any slight residual pulsation existing in the circuit 5, 6, 7, 8 and thereby neutralizing them.

It will be seen from the drawing that the connections to the end cells of both sets of batteries are made at separate and distinct points on the electrode. A detail of this is shown in Figs. 2 and 3.

The purpose of this special connection is to provide separate paths for input and output circuits of each set of cells, thereby further reducing the effects of any drop that might occur due to the resistance of contacts and leads.

The vacuum tube 14, Fig. 1, is inserted in a special socket adapter shown in Fig. 4 and in this case one leg of the filament 13 is disconnected from its regular position in the circuit and an independent connection from the same element made at a higher voltage tap in the output set of batteries.

By this means the possibility of inserting a low voltage tube in the high voltage socket is prevented. When it is desired to use the low voltage tap the regular socket is used.

The telephone 15 is in circuit with the high voltage B battery generator 21.

Transformer 16 may be a standard intervalve audio transformer in the plate circuit of another vacuum tube 17, which may be of different type than the tube 14, and includes in the plate circuit high voltage current from the generator 21.

The tube 17 may likewise be provided with one of my special socket adapters and I have shown another method of using it. In this case the grid return 18, is disconnected by the insulated cap from its regular position in the circuit and an independent connection made to the circuit of a voice transmitter, such as used in instruments for the deaf. This allows the use of a regular radio instrument in the home as an aid to hearing, and the transmitter 19 may be a very sensitive pick-up microphone, to respond to voices in the room, the regular telephone or special ear pieces being used for reception.

The generators 21 and 22 are my improved generators without audible commutator ripple and the motor 23 is of the same type, all being linked together by a common power transmission system, as shown in my copending application Serial No. 627,002 filed March 23, 1923, and application Serial No. 704,966, filed April 8, 1924. The antennæ 20 may be of the loop or open circuit type.

I have found it desirable for purposes of economy to disconnect the input and output circuits of the system when not in use, and I perform both operations simultaneously by switches having a common control as shown.

The socket adapter detailed in Figs. 4 and 5 is preferably molded from a composition such as bakelite.

Each prong of the adapter is permanently connected to an auxiliary binding post located at the top of the adapter to be easily accessible. Flexible leads may be substituted if desired.

Insulating caps of soft rubber or fiber are supplied with each adapter to be fitted over the prong of the element desired for independent connection as shown in Fig. 5.

The storage battery plate detailed in Fig. 2 is supplied with two separate lugs for independent connection to charging and discharging circuits connected to the same plate.

An alternative arrangement is shown in

Fig. 3 in which the plate is divided, and an impedance connected between sections as a further refinement to decrease effects of voltage drop.

My improved motor generator and current changing means or filter may both be conveniently located within a phonograph cabinet and supplied with a flexible cord and plug attachment for a lamp socket with the object of furnishing a compact and reliable source of current supply for vacuum tubes which may be located in the cabinet.

While I have described the application of my invention to particular systems it will be apparent to those skilled in the art that some of the elements may also be applied to other systems and that numerous applications thereof may be made without departing from the scope of the appended claims.

I claim:

1. In an electrolytic storage device, a plurality of electrically series connected cells, a set of divided plates of the same polarity in one end cell, a set of divided plates of the same polarity in the other end cell, the latter polarity being opposite to the former polarity, one portion of each set of divided plates of each end cell having a terminal for charging, and the other portion of each set of divided plates in each end cell having a terminal for discharging, and an impedance element connected between the charging and discharging terminals of each set of divided plates, respectively.

2. In an electrolytic current storing device, a set of divided end plates of the same polarity in one end of said device, a set of divided end plates of the same polarity in the other end of said device, the latter polarity being opposite to the former polarity, one portion of each set of divided plates in each end having a terminal for charging and the other portion of each set of divided plates in each end having a terminal for discharging and an impedance element connected between the charging and discharging terminals of each set of divided end plates, respectively.

In testimony whereof I have signed this specification this 13th day of April 1927.

EDWARD G. GAGE.